(12) United States Patent
Mitsuyu

(10) Patent No.: US 10,599,448 B2
(45) Date of Patent: Mar. 24, 2020

(54) INFORMATION PROCESSING APPARATUS, IC CHIP, INFORMATION PROCESSING METHOD, AND INFORMATION PROCESSING SYSTEM

(71) Applicant: SONY CORPORATION, Tokyo (JP)

(72) Inventor: Gaku Mitsuyu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/901,002

(22) Filed: Feb. 21, 2018

(65) Prior Publication Data
US 2018/0181416 A1    Jun. 28, 2018

Related U.S. Application Data

(63) Continuation of application No. 14/856,375, filed on Sep. 16, 2015, now Pat. No. 9,946,558, which is a
(Continued)

(30) Foreign Application Priority Data

Jan. 17, 2012   (JP) .................................. 2012-007322
May 16, 2012   (JP) .................................. 2012-112349

(51) Int. Cl.
| | |
|---|---|
| G06F 3/00 | (2006.01) |
| G06F 9/44 | (2018.01) |
| G06F 9/46 | (2006.01) |
| G06F 13/00 | (2006.01) |
| G06F 9/445 | (2018.01) |
| G06F 9/54 | (2006.01) |
| G06F 8/60 | (2018.01) |

(Continued)

(52) U.S. Cl.
CPC ............ *G06F 9/44589* (2013.01); *G06F 8/60* (2013.01); *G06F 9/441* (2013.01); *G06F 9/455* (2013.01); *G06F 9/45504* (2013.01); *G06F 9/54* (2013.01); *G06F 21/57* (2013.01)

(58) Field of Classification Search
CPC .................................................. G06F 9/44589
USPC ......................................................... 719/320
See application file for complete search history.

(56) References Cited

U.S. PATENT DOCUMENTS

| | | | |
|---|---|---|---|
| 8,024,778 B2 | 9/2011 | Cash et al. | |
| 8,646,059 B1 * | 2/2014 | von Behren | ......... G06Q 20/367 719/311 |

(Continued)

FOREIGN PATENT DOCUMENTS

| | | |
|---|---|---|
| CN | 1687905 A | 10/2005 |
| CN | 101510332 A | 8/2009 |

(Continued)

OTHER PUBLICATIONS

Office Action for JP Patent Application No. 2016-070046, dated Oct. 3, 2017, 4 pages of Office Action and 4 pages of English Translation.

(Continued)

*Primary Examiner* — Timothy A Mudrick
(74) *Attorney, Agent, or Firm* — Chip Law Group

(57) ABSTRACT

There is provided an information processing apparatus, including a multi-platform capable of managing a plurality of applications, and an operating system which operates on the multi-platform, and is capable of being activated by a command of the multi-platform.

20 Claims, 13 Drawing Sheets

Related U.S. Application Data continuation of application No. 13/739,760, filed on Jan. 11, 2013, now Pat. No. 9,158,598.

(51) Int. Cl.
  *G06F 9/455* (2018.01)
  *G06F 21/57* (2013.01)
  *G06F 9/4401* (2018.01)

(56) References Cited

U.S. PATENT DOCUMENTS

| | | |
|---|---|---|
| 2008/0290158 A1 | 11/2008 | Ando et al. |
| 2010/0049977 A1 | 2/2010 | Kanemoto et al. |
| 2010/0262672 A1 | 10/2010 | Sugiyama |
| 2011/0138390 A1 | 6/2011 | Takeuchi |
| 2012/0149302 A1 | 6/2012 | Sekiya et al. |
| 2014/0245070 A1 | 8/2014 | Rumble |

FOREIGN PATENT DOCUMENTS

| | | |
|---|---|---|
| CN | 101523418 A | 9/2009 |
| CN | 102087715 A | 6/2011 |
| CN | 103280020 A | 9/2013 |
| JP | 2002-366914 A | 12/2002 |
| JP | 2003-076954 A | 3/2003 |
| JP | 2006-031257 A | 2/2006 |
| JP | 2009-086930 A | 4/2009 |
| JP | 2010-117995 A | 5/2010 |
| JP | 2010-198306 A | 9/2010 |
| JP | 2010-267248 A | 11/2010 |
| JP | 2011-118837 A | 6/2011 |
| WO | 01/077920 A1 | 10/2001 |
| WO | 01/77920 A1 | 10/2001 |
| WO | 2005/124560 A1 | 12/2005 |

OTHER PUBLICATIONS

Office Action for JP Patent Application No. 2016-070046, dated Mar. 21, 2017, 04 pages of Office Action and 03 pages of English Translation.
Sugai, et al., "Basic of Java That is Studied from Error: Seventh Study of Basic of Exception Processing (No. 1)", Java WORLD, {KABU} IDG Japan, Jun. 1, 2005, vol. 9, No. 6, pp. 096-101.
Office Action for CN Patent Application No. 201310009383.4, dated May 22, 2017, 13 pages of Office Action and 18 pages of English Translation.
Li Zehua, "Non-Contact Multi-Chip Operating System Smart Card Design", Chinese Master's Theses Full-text Database, Information Science and Technology, Issue 6, Jun. 15, 2009, 15 pages.
Office Action received for CN Patent Application No. 201310009383.4, dated Jun. 14, 2016, 22 Pages of office Action and 13 Pages of English Translation.
Office Action for JP Patent Application No. 201310010898.6, dated Jul. 28, 2016, 09 pages of Office Action and 12 pages of English Translation.
Office Action for JP Patent Application No. 2012-112349, dated Oct. 6, 2015.
Manabu Sugai, ABCs of Java Studied from Error—[7th study] ABCs of Exception Handling is Studied (Part 1), Java WORLD, IDG Japan, Jun. 1, 2005, vol. 9, No. 6, pp. 4026-4101.
Notice of Allowance for U.S. Appl. No. 14/856,375, dated Jan. 17, 2018, 02 pages.
Non-Final Office Action for U.S. Appl. No. 14/856,375, dated Jun. 9, 2017, 15 pages.
Final Office Action for U.S. Appl. No. 14/856,375, dated Feb. 14, 2017, 12 pages.
Non-Final Office Action for U.S. Appl. No. 14/856,375, dated Sep. 14, 2016, 11 pages.
Advisory Action for U.S. Appl. No. 14/856,375, dated Aug. 2, 2016, 03 pages.
Final Office Action for U.S. Appl. No. 14/856,375, dated May 27, 2016, 12 pages.
Non-Final Office Action for U.S. Appl. No. 14/856,375, dated Nov. 17, 2015, 08 pages.
Notice of Allowance for U.S. Appl. No. 13/739,760, dated Jun. 5, 2015, 09 pages.
Office Action for CN Patent Application No. 201310009383.4, dated Feb. 16, 2017, 12 pages of Office Action and 16 pages of English Translation.
Notice of Allowance for U.S. Appl. No. 14/856,375, dated Jan. 2, 2018, 02 pages.
Notice of Allowance for U.S. Appl. No. 14/856,375, dated Dec. 12, 2018, 07 pages.
Office Action for JP Patent Application No. 2016-070046, dated Mar. 20, 2018, 05 pages of Office Action and 04 pages of English Translation.
Decision of Refusal for JP Patent Application No. 2016-070046, dated Sep. 25, 2018, 03 pages of Office Action and 02 pages of English Translation.
Decision to Dismiss the Amendment for JP Patent Application No. 2016-070046, dated Sep. 25, 2018, 09 pages of Office Action and 05 pages of English Translation.
Hideki Akaga "Leading-Edge Technology of IC Card and Use Trend, Seventh Symposium, Standardization Trend of IC Card Platform Technology (No. 2)", Business Communication Corporation, vol. 38, Issue 10, Oct. 1, 2001, pp. 92-96.
Office Action for CN Patent Application No. 201710339297.8, dated Mar. 1, 2019, 16 pages of Office Action and 12 pages of English Translation.
Office Action for JP Patent Application No. 2018-241805, dated Nov. 19, 2019, 04 pages of Office Action and 03 pages of translation.

\* cited by examiner

| Application ID | TYPE | SYSTEM NUMBER |
|---|---|---|
| A0 00 00 00 00 01 | Applet | - |
| A0 00 00 00 00 02 | Applet | - |
| A0 00 00 00 00 03 | FeliCa | 0 |
| A0 00 00 00 00 04 | FeliCa | 1 |

FIG. 3

| Parameter | | Length | Value |
|---|---|---|---|
| Header | | | – |
| New System AID length | | 1 | n (6 <= n <= 16) |
| New System AID | | N | |
| Package identifier | | 2 | 00 4Fh |
| Separate package | | 96 | |
| | Separate base package | 64 | |
| | Package identifier | 2 | 00 4Fh |
| | System key version | 2 | <<little endian>> |
| | System key | 16 | |
| | Area0 key version | 2 | <<little endian>> |
| | Area0 key | 16 | |
| | System Code | 2 | ignored |
| | Padding | 8 | |
| | Package MAC | 16 | |
| Number of blocks | | 2 | <<little endian>> |
| Padding | | 14 | |
| Package MAC | | 16 | |

Columns "New System AID length" and "New System AID" are bracketed as ALLOCATED AID INFORMATION. The remaining rows are bracketed as SEPARATE PACKAGE.

FIG. 8

| Privilege | Description |
|---|---|
| Security Domain | Application is a Security Domain. |
| DAP Verification | Application is capable of verifying a DAP: Security Domain privilege shall also be set. |
| Delegated Management | Application is capable of Delegated Card Content Management: Security Domain privilege shall also be set. |
| Card Lock | Application has the privilege to lock the card. |
| Card Terminate | Application has the privilege to terminate the card. |
| Card Reset | Application has the privilege to modify historical bytes on one or more card interfaces. This privilege was previously labeled "Default Selected" |
| CVM Management | Application has the privilege to manage a shared CVM of a CVM Application. |
| Mandated DAP Verification | Application is capable of and requires the verification of a DAP for all load operations: Security Domain privilege and DAP Verification privilege shall also be set. |
| Trusted Path | Application is a Trusted Path for inter-application communication. |
| Authorized Management | Application is capable of Card Content Management; Security Domain privilege shall also be set. |
| Token Verification | Application is capable of verifying a token for Delegated Card Content Management. |
| Global Delete | Application may delete any Card Content. |
| Global Lock | Application may lock or unlock any Application. |
| Global Registry | Application may access any entry in the GlobalPlatform Registry. |
| Final Application | The only Application accessible in card Life Cycle State CARD_LOCKED and TERMINATED. |
| Global Service | Application provides services to other Applications on the card. |
| Receipt Generation | Application is capable of generating a receipt for Delegated Card Content Management. |
| Ciphered Load File Data Block | The Security Domain requires that the Load File being associated to it is to be loaded ciphered. |

FIG. 14

The INSTALL command message shall be coded according to the following table

| Code | Value | Meaning |
|---|---|---|
| CLA | 80-8F<br>C0-CF<br>E0-EF | |
| INS | E6 | INSTALL |
| P1 | XX | Reference Control Parameter P1 |
| P2 | 00, 01, or 03 | |
| LC | XX | Length of data field |
| DATA | XXXX | Install data |
| Le | 00 | |

Reference Control Parameter P1

| b8 | b7 | b6 | b5 | b4 | b3 | b2 | b1 | Meaning |
|---|---|---|---|---|---|---|---|---|
| 0 | - | - | - | - | - | - | - | Last (or only) command |
| 1 | - | - | - | - | - | - | - | More INSTALL commands |
| - | 0 | 0 | 0 | 1 | - | - | 0 | For make selectable |
| - | 0 | 0 | 0 | - | 1 | - | 0 | For install |
| - | 0 | 0 | 0 | - | - | 1 | 0 | For load |

Reference Control Parameter P2

"00" indicates that no information is provided
"01" indicates the beginning of the combined Load, Install and Make Selectable process
"03" indicates the end of the combined Load, Install and Make Selectable process.

FIG. 15

Data Field for Install [for install]

| Name | Length | Value | Presence |
|---|---|---|---|
| Length of Executable Load File AID | 1 | 00 or 05 – 10 | Mandatory |
| Executable Load File AID | 0 or 5-16 | xxxx... | Conditional |
| Length of Executable Module AID | 1 | 00 or 05 – 10 | Mandatory |
| Executable Module AID | 0 or 5-16 | xxxx... | Conditional |
| Length of Application AID | 1 | 05 – 10 | Mandatory |
| Application AID | 5-16 | xxxx... | Mandatory |
| Privileges | 1,3 | | Mandatory |
| Length of Install Parameter field | 1-2 | 02 – 7F or 8180 –81FF | Mandatory |
| Install Parameter field | 2-n | | Mandatory |
| Length of Install Token | 1-3 | | Mandatory |
| Install Token | | | Conditional |

AID OF FeliCa IS ENTERED HERE (→ Executable Module AID)

THIS AID CAN BE FREELY SET BY USER (→ Application AID)

FeliCa SIZE INFORMATION IS INCLUDED IN HERE (→ Install Parameter field)

INFORMATION PROCESSING APPARATUS, IC CHIP, INFORMATION PROCESSING METHOD, AND INFORMATION PROCESSING SYSTEM

CROSS REFERENCE TO RELATED APPLICATION

The present application is a continuation application of U.S. patent application Ser. No. 14/856,375, filed Sep. 16, 2015, which is a continuation application of U.S. patent application Ser. No. 13/739,760, filed Jan. 11, 2013, and which claims the priority from prior Japanese Priority Patent Applications 2012-112349 filed in the Japan Patent Office on May 16, 2012 and 2012-007322 filed in the Japan Patent Office on Jan. 17, 2012. Each of the above-referenced applications is hereby incorporated herein by reference in its entirety.

BACKGROUND

The present disclosure relates to an information processing apparatus, an IC chip, an information processing method, a program, and an information processing system.

In related art, IC (Integrated Circuit) cards, in which an integrated circuit capable of performing recording and calculation of information is embedded, have been in practical use. Among other things, IC cards, also called smart cards, which include a processor in the integrated circuit and realize advanced information processing, have been widely used in recent years in various applications as payment and personal identical mechanisms in daily life.

An information process on an IC card is normally performed by receiving instructions given by an external apparatus capable of communicating with the IC card. There are various instructions given to the IC card which execute the input/output and calculation of information, or execute security processes or the like, in the IC card. Accordingly, many IC cards developed in recent years have an operating system (hereinafter, called an OS), which becomes a base for executing such an instruction group, installed in a circuit. Then, there are cases where a plurality of types of OS are installed in the IC card, so as to improve the versatility of the IC card by enabling coordination of the IC card with a plurality of external apparatuses conforming to different standards.

For example, technology is disclosed in JP 2011-118837A in which instructions from an external apparatus are executed, for an application which imitates an OS operating on an execution environment different from that of a normal one, without changing the specifications of the instructions from the external apparatus.

SUMMARY

However, the technology disclosed in JP 2011-118837A assumes that a FeliCa OS is used as an applet on a JavaCard (registered trademark) OS. In this case, a problem occurs in that the processing speed of the FeliCa OS will become comparatively slower, since the FeliCa OS is operating on the JavaCard (registered trademark) OS. Accordingly, it is desired to improve the processing speed of the FeliCa OS.

Further, in the case where a plurality of business operators (service providers) use the FeliCa OS, the technology disclosed in JP 2011-118837A does not assume that the FeliCa OS is allocated to each of the business operators. Accordingly, it is desired to allocate the FeliCa OS to each of the business operators, and for each of the business operators to be able to use the FeliCa OS.

Further, in the case where the FeliCa OS is activated, it may be necessary to use an independent command for each card, and to use an independent format in each card. Accordingly, it is desired to activate the FeliCa OS by a simple process.

According to an embodiment of the present disclosure, an information processing apparatus is provided which includes a multi-platform capable of managing a plurality of applications, and an operating system which operates on the multi-platform, and is capable of being activated by a command of the multi-platform.

Further, the command may include a size of a memory region which the operating system is capable of using.

Further, the multi-platform may manage the plurality of applications with authentication codes, and the multi-platform may manage the operating system with the authentication codes.

Further, the operating system may be capable of performing region separation.

Further, the multi-platform may have a table which includes authentication codes corresponding to each region on which region separation is performed, and authentication codes corresponding to the plurality of applications.

Further, the multi-platform may send a separate command for performing region separation on the operating system to the operating system, and the separate command may include authentication codes corresponding to new regions obtained by the region separation and the number of separate blocks according to the region separation.

Further, when the separate command is received from the multi-platform, the operating system may perform region separation on the number of blocks specified by the separate command, and may return authentication codes of the regions newly generated by the region separation and system numbers in the operating system, to the multi-platform.

Further, according to another embodiment of the present disclosure, an IC chip is provided which includes a multi-platform capable of managing a plurality of applications, and an operating system which operates on the multi-platform, and is capable of being activated by a command of the multi-platform.

Further, according to another embodiment of the present disclosure, an information processing method is provided which includes receiving, at a multi-platform capable of managing a plurality of applications, a command for activating an operating system which operates on the multi-platform; and executing, at the multi-platform which has received the command, a process which activates the operating system.

Further, the information processing method may also include sending, as a separate command for performing region separation on the operating system, authentication codes corresponding to new regions obtained by the region separation, and the number of separate blocks according to the region separation, from the multi-platform to the operating system, separating regions according to the separate command by the operating system which has received the separate command, returning system numbers corresponding to the regions obtained by the region separation of the operating system to the multi-platform, and registering the system numbers in a table in association with authentication codes corresponding to the regions obtained by the region separation of the operating system.

Further, according to another embodiment of the present disclosure, a program is provided which causes a computer to execute the functions of receiving, at a multi-platform capable of managing a plurality of applications, a command for activating an operating system which operates on the multi-platform, and executing, at the multi-platform which has received the command, a process which activates the operating system.

Further, the program may further cause a computer to execute the functions of sending, as a separate command for performing region separation on the operating system, authentication codes corresponding to new regions obtained by the region separation and the number of separate blocks according to the region separation, from the multi-platform to the operating system, separating regions according to the separate command by the operating system which has received the separate command, returning system numbers corresponding to the regions obtained by the region separation of the operating system to the multi-platform, and registering the system numbers in a table in association with authentication codes corresponding to the regions obtained by the region separation of operating system.

Further, according to another embodiment of the present disclosure, an information processing system is provided which includes a first apparatus which sends, in order to perform region separation on an operating system which operates on a multi-platform capable of managing a plurality of applications and use that operating system, authentication codes corresponding to new regions obtained by the region separation and the number of separate blocks according to the region separation, a second apparatus which generates a separate command including the authentication codes and the number of blocks, and a third apparatus which includes the multi-platform and the operating system, and which receives the separate command and performs region separation on the operating system, and registers authentication codes corresponding to the new regions obtained by the region separation and a system number, to a table.

According to the embodiments of the present disclosure, it becomes possible to activate an operating system installed in an information processing apparatus by a prescribed command.

BRIEF DESCRIPTION OF THE DRAWINGS

FIG. 3 is a schematic diagram which shows a command for separating regions of a FeliCa OS;

FIG. 8 is a schematic diagram which shows an example of an authority, in which allocation is possible in a Security Domain, in a global platform;

FIG. 14 is a schematic diagram for describing a command (Install for install and make selectable) defined by a global platform;

FIG. 15 is a schematic diagram which shows a data field (DATA) of FIG. 14; and

DETAILED DESCRIPTION OF THE EMBODIMENT(S)

Figures 1, 2:
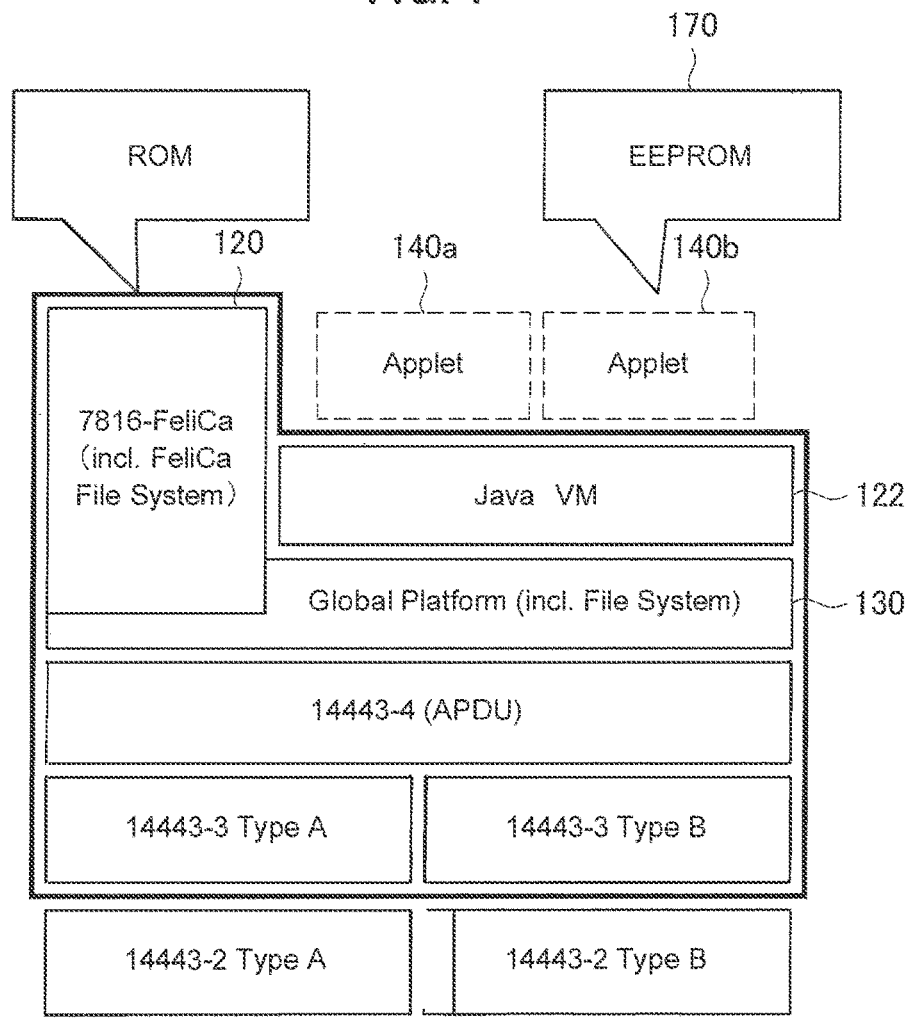
FIG. 1 is a schematic diagram which mainly shows a schematic configuration of an information processing apparatus according to an embodiment of the present disclosure.
FIG. 2 is a schematic diagram which shows a table of AIDs (Application IDs), program types, and system numbers managed by a platform section.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. Example configuration of an information processing apparatus
2. Region separation of a FeliCa OS
3. Technique of region separation
4. Process flow of region separation
5. Specific example of separation and registration
6. Advantages when compared to the case of region separation on a multi-platform
7. Regarding activation of the FeliCa OS

[1. Example configuration of an information processing apparatus]

First, an information processing apparatus according to an embodiment of the present disclosure will be described. FIG. 1 is a schematic diagram which mainly shows a schematic configuration of an information processing apparatus according to an embodiment of the present disclosure. The information processing apparatus 100 is a communication apparatus which can communicate with an external apparatus 200. For example, the external apparatus may be a reader/writer which reads/writes information recorded in the information processing apparatus 100. Further, the external apparatus may be an information processing apparatus which provides a user with arbitrary applications by using functions implemented in the information processing apparatus 100. For example, in the case where the information processing apparatus 100 performs non-contact type communication with the external apparatus 200, a communication section of the information processing apparatus 100 may be realized as a communication interface or the like conforming to standard specifications such as ISO/IEC14443 or ISO/IEC18092 (also known as: NFC (Near Field Communication)).

The information processing apparatus 100 is typically realized as a contact type or a non-contact type IC card, IC chip, or the like. Further, the information processing apparatus 100 may be a communication module or the like installed in an information communication terminal, such as a mobile phone. The information processing apparatus 100 provides an instruction group for executing the input/output and various calculations of information recorded by the apparatus itself. Then, when an instruction is input from the external apparatus, the information processing apparatus 100 executes a process corresponding to this instruction, and outputs a response to the external apparatus.

FIG. 1 hierarchically shows mainly a software configuration of the information processing apparatus 100. The information processing apparatus 100 can include a central processing unit, such as a CPU, and the configuration shown in FIG. 1 can be realized by the CPU executing a program. In this case, this program can be stored in a memory in which the information processing apparatus 100 is included, or in a memory connected from the outside.

As shown in FIG. 1, the information processing apparatus 100 includes a FeliCa Operating System 120 and a Java Operating System (Java Card (registered trademark) Operating System) 122 as Operating Systems (hereinafter, called "OS"), and a multi-platform 130. Note that a different OS, such as MULTOS, may be included instead of the Java OS 122.

The multi-platform 130 is a table which manages a plurality of applications, and can be configured from a so-called Global Platform (Incl. File System). The global platform is used as the standard specifications of an ordinary IC card, and a command system, such as a mutual authentication command or a command of an application download, is predetermined in the global platform.

Applets 140a and 140b are programs which operate on the Java OS 122. A user can select and operate either of the Applets 140a or 140b which operate on the Java OS 122.

While the FeliCa OS 120 operates on the multi-platform 130, the FeliCa OS 120 can be selected and operated in the same way as the Applets 140a and 140b, which operate on the Java OS 122, in the information processing apparatus 100 of the present embodiment. That is, for the user, the FeliCa OS 120 is recognized as a program which operates on the Java OS 122 in the same way as the Applets 140a and 140b.

While it is also possible for the FeliCa OS 120 to operate on the Java OS 122, when the FeliCa OS 120 operates on the Java OS 122, it results in such trouble as the processing speed becoming comparatively slower. Accordingly, the processing speed of the FeliCa OS 120 can be improved by operating the FeliCa OS 120 on the multi-platform 130. Further, since the FeliCa OS 120 is recognized by a user as a program which operates on the Java OS 122, it is possible for the user to select the FeliCa OS 120 in the same way as the selection of the Applets 140a and 140b.

[2. Region Separation of a FeliCa OS]

The FeliCa OS 120 is an OS capable of separating regions of a file system, and the separated regions can be used by different providers, for example. In this way, a single FeliCa OS 120 can behave as a plurality of FeliCa OSs. In the case where region separation is performed on the FeliCa OS 120, an AID (Application ID: authentication code) can be allocated to each of the regions. A system number for management on the FeliCa OS 120 can be allocated to each of the regions. The AID and system number are allocated to each service provider. That is, the FeliCa OS 120 physically separates memory regions by region separation, and can logically provide a mutually-exclusive system for the respective memory regions.

FIG. 2 is a schematic diagram which shows a table of AIDs (Application IDs), program types, and system numbers managed by the multi-platform 130. As shown in FIG. 2, the multi-platform 130 has tables which manage the AID, type and FeliCa logical system number of each application, and can also unitarily manage a sub-platform in a multi-application platform by the AID. As shown in FIG. 2, the AID, program type and system number are managed in a state in which a correspondence can be attached. The system number is added only to the regions of the FeliCa OS, and the system number is not added to the Applets 140a and 140b. Note that the AID is determined by ISO7816.

In this way, in the information processing apparatus 100 of the present embodiment, it is possible to select and use an intended region on the FeliCa OS 120 by specifying AIDs, so that an AID is allocated to each region to which region separation is performed on the FeliCa OS 120.

There is a concept of logical separation in the FeliCa OS 120, such as described above, and there is an arrangement which makes it look as if a plurality of cards exists, by logically separating the memory regions of the FeliCa OS 120. Here, this logical separation of regions is called a system. When a FeliCa system is logically separated by a Separate command, an AID is allocated to the newly created system, and is registered in an exclusive table. In this way, a different AID is allocated for each of the different logical systems of the FeliCa OS 120, and each of the logical systems can be unitarily managed with applications and applets other than FeliCa on the multi-platform 130. When viewed from the outside of the information processing apparatus 100, the FeliCa system can be treated in the same way as an ordinary application or applet, since the individual logical systems of the FeliCa OS 120 have the appearance of a single application on the multi-platform 130.

Further, since logical separation can be executed by one independent command of the FeliCa called Separate, the process is simplified, and it can also be executed without respective business operators having knowledge of both sets of key information. Therefore, a method in which business operators, other than the SSD, separately manage a key can be provided for the multi-platform, by merging the above described arrangement with a multi-application platform such as a global platform.

[3. Technique of Region Separation]

Next, a technique for performing region separation on the FeliCa OS 120 will be described. While the region of the FeliCa OS 120 is originally a single region, the region of the FeliCa OS 120 is separated by sending a prescribed command from the multi-platform 130. FIG. 3 is a schematic diagram which shows a command for separating the region of the FeliCa OS 120. As shown in FIG. 3, a logically separated region of a FeliCa sub-platform is allocated as one region of the multi-platform 130 by sending a command, which combines a separate package of the FeliCa and an AID value to be newly allocated, from the multi-platform 130 to the FeliCa OS 120.

The data of the "Number of blocks" in FIG. 3 is information showing which blocks are to be secured by the region separation of this command. In the case where the "Number of blocks" is "2", such as in FIG. 3, securing two blocks is shown by performing region separation on the current FeliCa OS 120.

In the FeliCa OS 120, when the command of FIG. 3 is received, the command is decoded, and by referring to the items of the "Number of blocks", region separation is performed for the regions specified by the "Number of blocks". Then, AIDs and system numbers managed at the FeliCa OS 120 side are provided, and are sent back to the multi-platform 130. In this way, the table of FIG. 2 can be updated in the multi-platform 130, for the newly separated regions.

[4. Process Flow of Region Separation]

Figure 4:
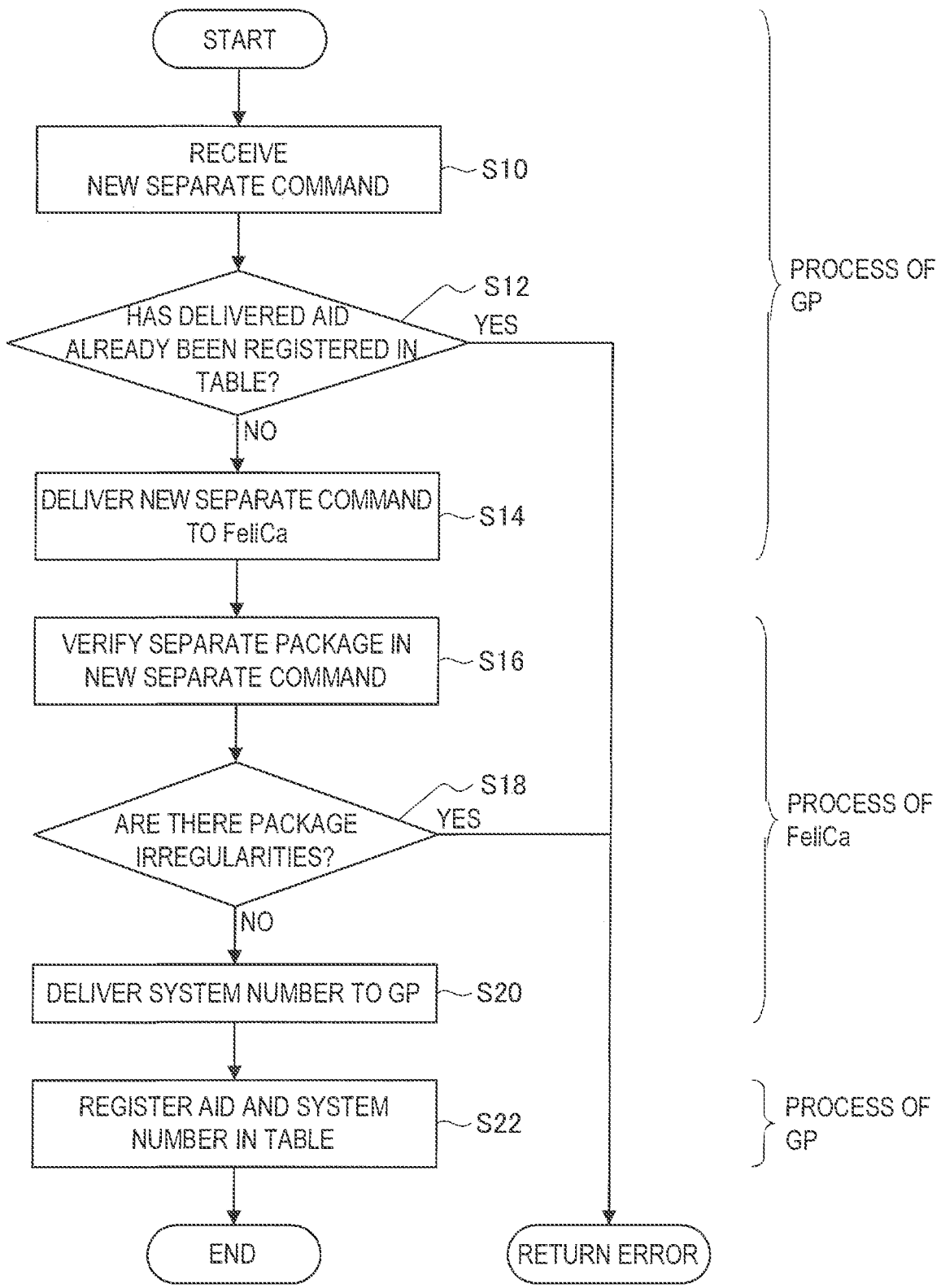
FIG. 4 is a flow chart which shows the process of performing region separation on the FeliCa OS.

FIG. 4 is a flow chart which shows the process of performing region separation to the FeliCa OS 120. First, in step S10, the multi-platform 130 receives a new Separate command. Here, the AID provided by the separation is included in the new Separate command.

Next, in step S12, it is judged whether or not the AID delivered by the new Separate command has already been registered in the table of the multi-platform 130 (FIG. 2). In the case where the AID has not been registered, it proceeds to the following step S14, and a new Separate command (FIG. 3) is delivered to the FeliCa OS 120. On the other hand, in the case where the AID has been registered, an error is sent back.

After step S14 it proceeds to step S16. In step S16, the FeliCa OS 120 which has received the new Separate command verifies a separate package in the new Separate command (FIG. 3).

In the following step S18, it is judged whether or not there are irregularities in the package as a result of the verification of the separate package. Here, the irregularities are an irregularity of a MAC, an irregularity of a code key, an irregularity of the number of separate blocks, or the like. In the case where there are irregularities, an error is sent back.

On the other hand, in the case where there are no irregularities in step S18, it proceeds to step S20. In Step S20, the FeliCa OS 120 performs region separation, and AIDs and system numbers of the regions obtained by the separation are sent to the multi-platform 130.

In the following step S22, the multi-platform 130 registers the AIDs and system numbers received from the FeliCa OS 120 in a table (FIG. 2).

[5. Specific Example of Separation and Registration]

Figure 5:
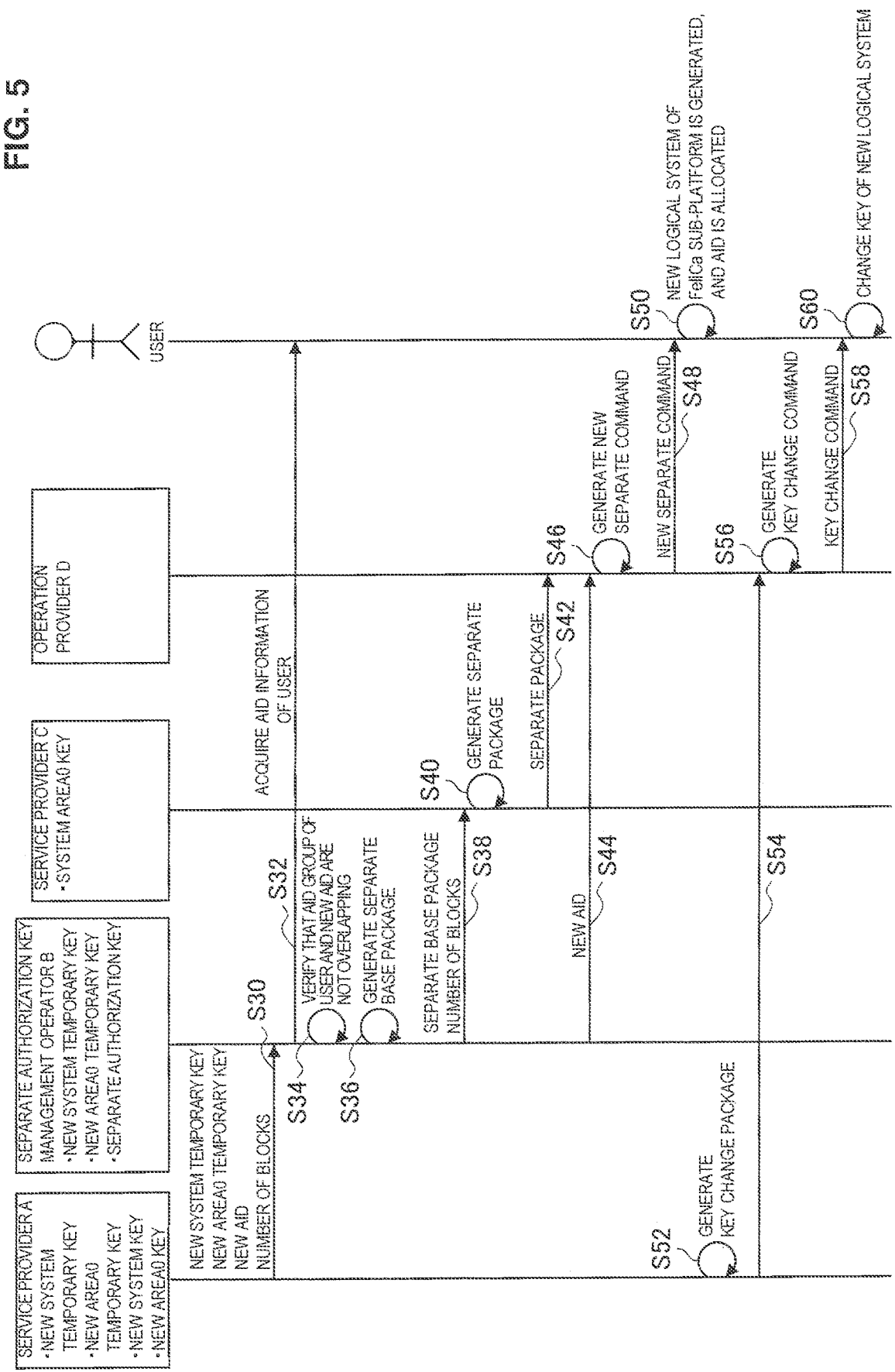
FIG. 5 is a flow chart which shows a specific example of separating regions of the FeliCa OS, which are in an information processing apparatus, via the internet.

Next, a specific example of separating regions of the FeliCa OS 120 (FeliCa sub-platform), which are in the information processing apparatus 100, via the internet will be described based on FIG. 5. Here, an example is shown in which a Service Provider C is already using a region in the FeliCa OS 120, and a new Service Provider A separates the regions in the FeliCa OS 120 by specifying a new AID. As an example, the Service Provider C is a railroad entrepreneur, and the Service Provider A is an electronic money provider. Further, a Separate Authorization Key Management Operator B is an operator who has the authority to separate the FeliCa OS 120. An Operation Provider D is a provider who issues (manufactures) the information processing apparatus 100. A user is a user of the information processing apparatus 100. In FIG. 5, each set of key information enclosed within the framework of the Service Provider A, the Separate Authorization Key Management Operator B, the Service Provider C and the Operation Provider D, is key information which each of the service providers and business operators/providers has knowledge of. Each of the service providers and business operators/providers has an apparatus which performs each of the steps of FIG. 5.

First, in step S30, the Service Provider A sends a new system temporary key, a new Area0 temporary key, a new AID, and the number of separate blocks to the Separate Authorization Key Management Operator B. Here, the new AID is an AID corresponding to the new regions obtained by the region separation of the FeliCa OS 120. Further, the number of blocks is the number of regions which the Service Provider A is to separate. The new system temporary key and the new Area0 temporary key are temporary keys which both the Service Provider A and Separate Authorization Key Management Operator B possess, and which are temporarily used for region separation.

In step S32, the Separate Authorization Key Management Operator B acquires information of the AID already set in the information processing apparatus 100 possessed by the user. In step S34, the Separate Authorization Key Management Operator B verifies that a new AID sent from the Service Provider A does not overlap with the information of the AID obtained from the user in step S32. In the case where it does not overlap, the Separate Authorization Key Management Operator B generates a separate base package (step S36). Then, the Separate Authorization Key Management Operator B sends the separate base package, and the number of blocks sent from the Service Provider A, to the Service Provider C (step S38). Here, the separate base package corresponds to the "Separate base package" shown in FIG. 3.

The Service Provider C generates a separate package from the separate base package and the number of blocks sent from the Separate Authorization Key Management Operator B (step S40). The separate package corresponds to the "Separate package" shown in FIG. 3. As shown in FIG. 3, information of the "Number of blocks" is included in the separate package, and this information corresponds to the number of blocks.

The Service Provider C sends the generated separate package to the Operation Provider D (step S42). Further, the Separate Authorization Key Management Operator B sends the new AID to the Operation Provider D (step S44).

The Operation Provider D generates a new Separate command from the sent separate packet and the new AID. The Separate command corresponds to the information shown in FIG. 3, and the "New System AID" shown in FIG. 3 corresponds to the new AID. The Operation Provider D sends this Separate command to the information processing apparatus 100 (mobile device) possessed by the user (step S48).

In the information processing apparatus 100 possessed by the user, a new logical system (region) of the sub-platform of the FeliCa OS 120 is generated, and a new AID for the generated logical system is allocated (step S50). Note that in the case where the information processing apparatus 100 is not made available to the user, and the Operation Provider D issues (manufactures) a new information processing apparatus 100, an information processing apparatus 100 is issued (manufactured) which has regions of the Service Provider C and the Service Provider A installed on the FeliCa OS 120.

In the process described above, a new AID can be allocated by separating and generating a new region of the Service Provider A, for the information processing apparatus 100 in which only a region of the Service Provider C has been generated on the FeliCa OS 120.

Next, the Service Provider A performs a process which changes a key relating to the new region of the FeliCa OS 120 of the information processing apparatus 100. Since the above described temporary key is used for region separation, and is also known to the Separate Authorization Key Management Operator B, the Service Provider A changes the key. In step S52, the Service Provider A generates a key change package. The key change package is sent to the Operation Provider D (step S54), and a key change command is generated (step S56). The key change command is sent from the Operation Provider D to the information processing apparatus 100 possessed by the user (step S58). In the information processing apparatus 100, the key of the region (logical system) newly generated by the region separation is changed (step S60).

[6. Advantages when Compared to the Case of Region Separation on a Multi-Platform]

As described above in the present embodiment, the FeliCa OS 120 is installed on the multi-platform 130, and region separation of the FeliCa OS 120 is performed. Here, the advantages of the present embodiment, comparing the present embodiment to the case where there is immediate region separation on the multi-platform 130, will be described.

Figure 6:
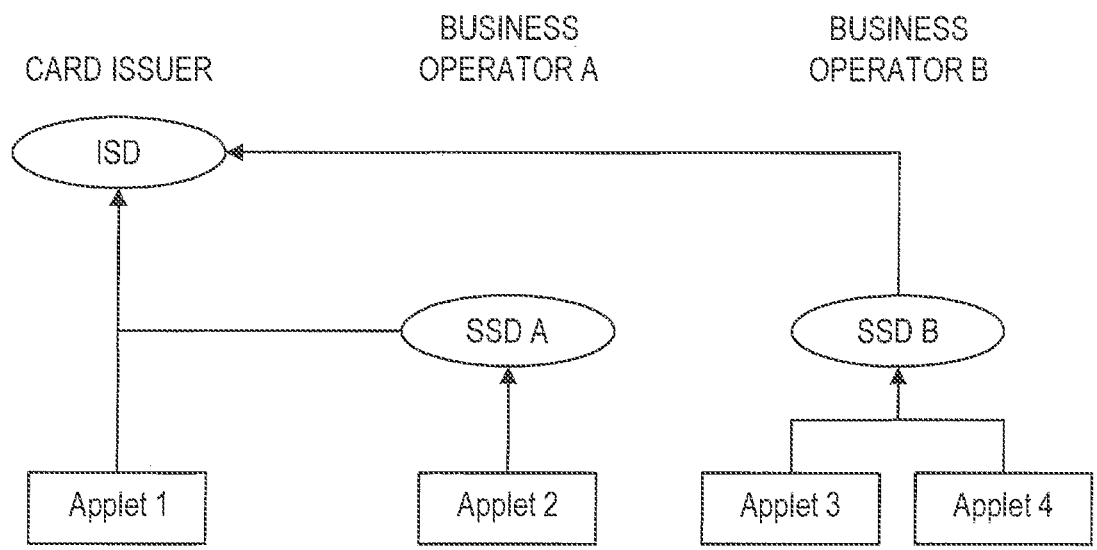
FIG. 6 is a schematic diagram which shows an example of installing an applet under the control of each SSD in a global platform, by retaining an SSD of each business operator in an information processing apparatus (card)

There is a concept of a Security Domain in a global platform (GP), and there are two types existing in the Security Domain, which are an ISD (Issuer Security Domain) and an SSD (Supplementary Security Domain). The ISD is a Mandatory Domain. On the other hand, the SSD is optional, and it is possible for a plurality of SSDs to exist. The Security Domain manages an independent key for each domain. Therefore, as shown in FIG. 6, applets under the control of each SSD can be installed and deleted without informing mutual key information, by retaining the SSD of each of the business operators in the information processing apparatus (card) 100.

Figure 7:
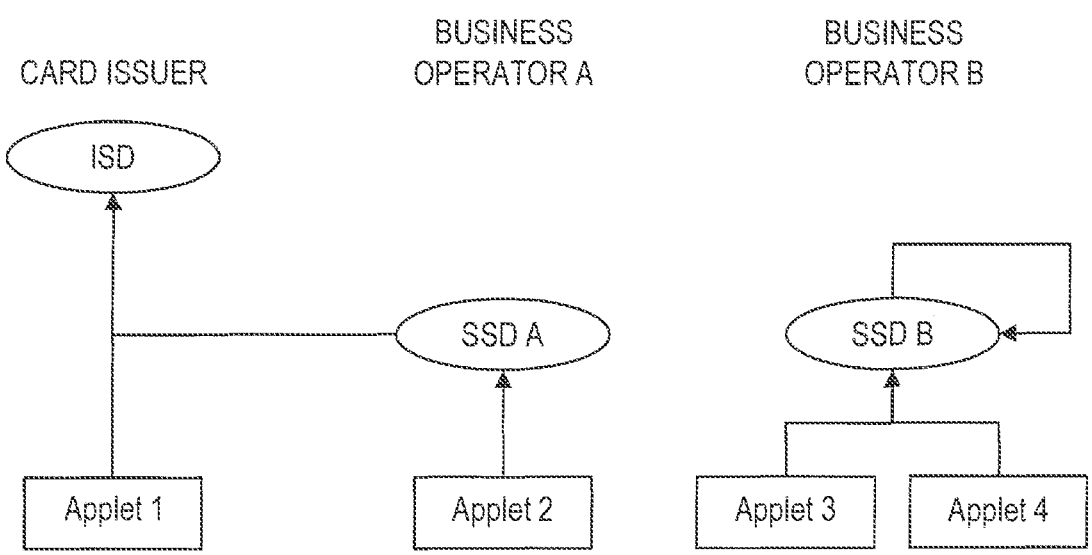
FIG. 7 is a schematic diagram which shows an example of associating an SSD to itself in a global platform, by using an Install command.

However, many authorities, such as shown in FIG. 8, may be necessary to be set in the Security Domain, and there is a problem that the process becomes complicated. FIG. 8 is a schematic diagram which shows an example of an authority, in which allocation is possible in a Security Domain, in a global platform. Additionally, while there is flexibility, such as associating an SSD to itself by using an Install (Install [for extradition]) command such as in FIG. 7, this concept itself has a difficult aspect.

Figure 9:
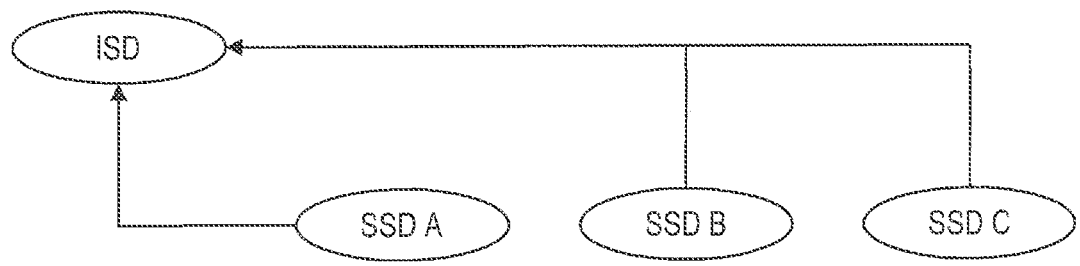
FIG. 9 is a schematic diagram which shows a procedure for realizing a process corresponding to 4 separations of a FeliCa OS by using an SSD.

For example, the following procedures may be necessary for realizing a process corresponding to 4 separations of the FeliCa OS 120 by using SSDs. First, as shown in FIG. 9, an SSD A is installed in a first step, an SSD B is installed in a second step, and an SSD C is installed in a third step.

Figure 10:
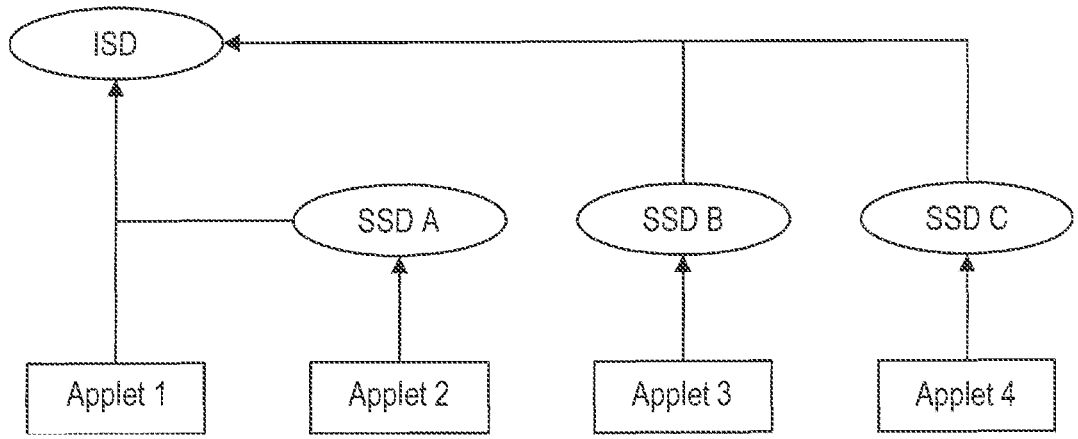
FIG. 10 is a schematic diagram which shows a procedure for realizing a process corresponding to 4 separations of a FeliCa OS by using an SSD.

Next, as shown in FIG. 10, an Applet 1 is loaded and installed under the control of the ISD in a fourth step, and an Applet 2 is loaded and installed under the control of the SSD A in a fifth step. Additionally, an Applet 3 is loaded and installed under the control of the SSD B in a sixth step, and an Applet 4 is loaded and installed under the control of the SSD C in a seventh step.

Figure 11:
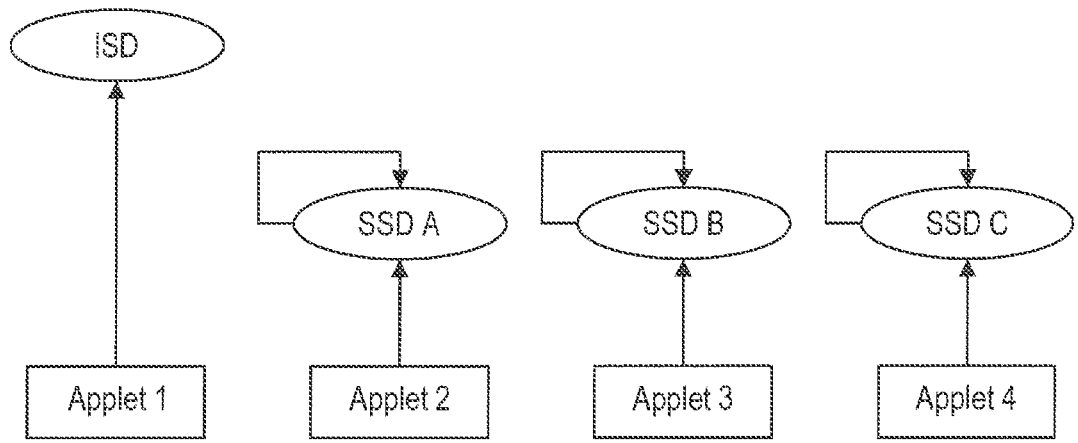
FIG. 11 is a schematic diagram which shows a procedure for realizing a process corresponding to 4 separations of a FeliCa OS by using an SSD.

Next, as shown in FIG. 11, the SSD A is associated to itself in an eighth step, the SSD B is associated to itself in a ninth step, and the SSD C is associated to itself in a tenth step.

As described above, when regions corresponding to 4 separations are realized on the FeliCa OS 120 by using SSDs, at least ten steps may be necessary.

On the other hand, in the present embodiment, since only the Separate command shown in FIG. 3 is sent from the multi-platform to the FeliCa OS 120, three times at the most, and originally one region existed on the FeliCa OS 120, it is possible to separate, into 4, the FeliCa OS 120.

In the present embodiment, the FeliCa OS 120 is set on the multi-platform 130, and region separation is performed on the FeliCa OS 120. Accordingly, the present embodiment becomes a configuration in which the FeliCa OS 120, which is a multi-platform, is arranged on the multi-platform 130 capable of managing a plurality of applications. Accordingly, management of each region, setting and management of the keys, or the like, can be performed at the FeliCa OS 120 side. Therefore, it is possible to easily perform management of the keys for each region or the like on the FeliCa OS 120.

[7. Regarding Activation of the FeliCa OS]

Next, activation of the FeliCa OS 120 will be described. In the case where the FeliCa OS 120 is activated from the beginning, there are cases in which the FeliCa OS 120, which has not been activated at the outset, is activated afterwards in the information processing apparatus 100.

In the present embodiment, in the case where the FeliCa OS 120 of the information processing apparatus 100 is non-active, the FeliCa OS 120 can be activated by using a command of the multi-platform 130.

Specifically, activation of the FeliCa OS 120 is performed by using a command (Install for install and make selectable) of the global platform, which is the multi-platform 130.

Further, the size of the memory regions of an NVM (EEPROM 170) capable of being used by the FeliCa OS 120 is determined, based on size information included in the Install command (Install for install and make selectable) of the global platform.

When the FeliCa OS 120 is activated, a format process is performed in the memory regions of the EEPROM 170 capable of being used by the FeliCa OS 120. Further, writing of information or the like is performed by the FeliCa OS 120, in the memory regions of the EEPROM 170 capable of being used by the FeliCa OS 120.

Memory regions corresponding to the Applets 140a and 140b are secured in the EEPROM 170 of the information processing apparatus 100. Further, when the FeliCa OS 120 is activated, the memory regions of the EEPROM 170 are secured based on the size information included in the Install command. The size of each memory region is registered in a table. Accordingly, when activating the FeliCa OS 120, it is judged whether or not memory regions of a size shown by the size information included in the Install command can be secured, by referring to the registration information of the table.

Note that in the case where the FeliCa OS 120 is not activated, the EEPROM 170 of the information processing apparatus 100 is used by the entire multi-platform 130. In this case, the information processing apparatus 100 can be used as a card of a genuine global network.

Figure 12:
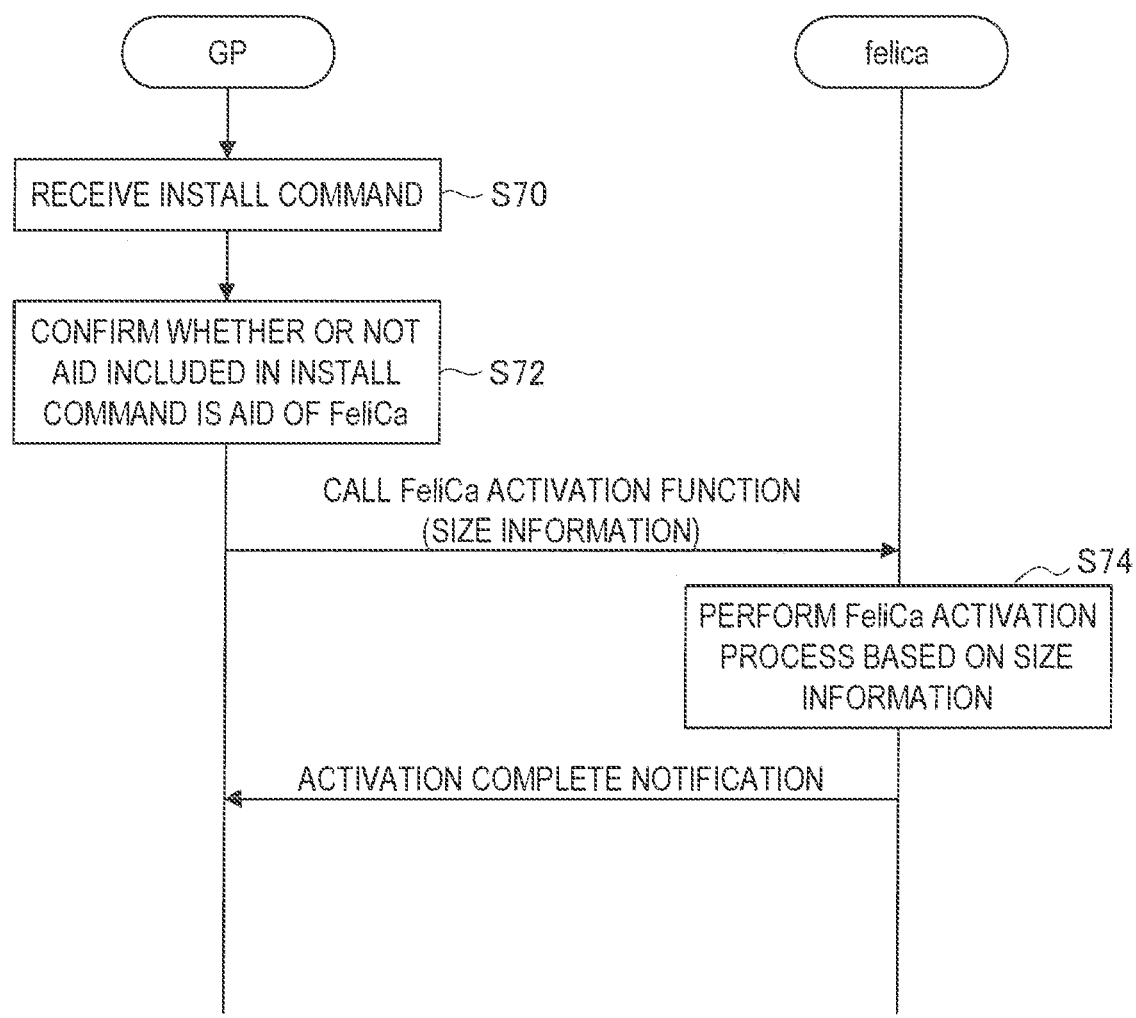
FIG. 12 is a flow chart which shows a process of activation of a FeliCa OS.

FIG. 12 is a flow chart which shows a process of activation of the FeliCa OS 120. First, in step S70, the multi-platform 130 receives an Install command. Note that in the case where the Install command is not received, it will standby until the Install command is received in step S70.

In the following step S72, the multi-platform 130 judges whether or not the AID included in the Install command is the AID of the FeliCa OS 120.

In the case where the AID included in the Install command is the AID of the FeliCa OS 120, it proceeds to the following step S74, and the multi-platform 130 calls an activation function of the FeliCa OS 120 by using the Install command (Install for install and make selectable). Size information of the FeliCa OS 120 is included in this command. In the following step S76, the FeliCa OS 120 performs an activation process based on the size information.

In the following step S78, when the activation process of the FeliCa OS 120 is completed, an activation complete notification is sent from the FeliCa OS 120 to the multi-platform 130.

Figure 13A:
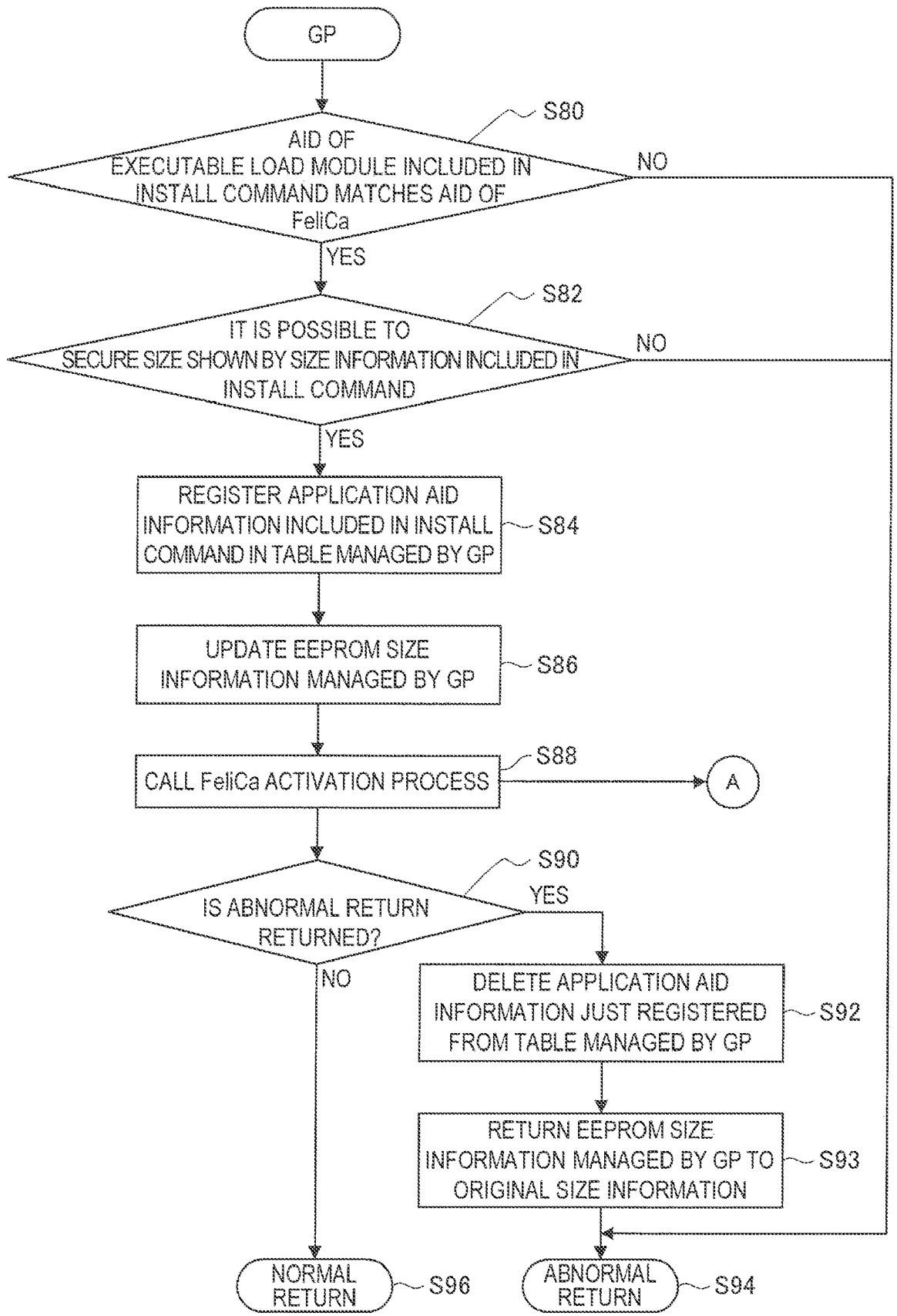
FIG. 13A is a flow chart which shows in detail the process which activates the FeliCa OS.
Figure 13B:
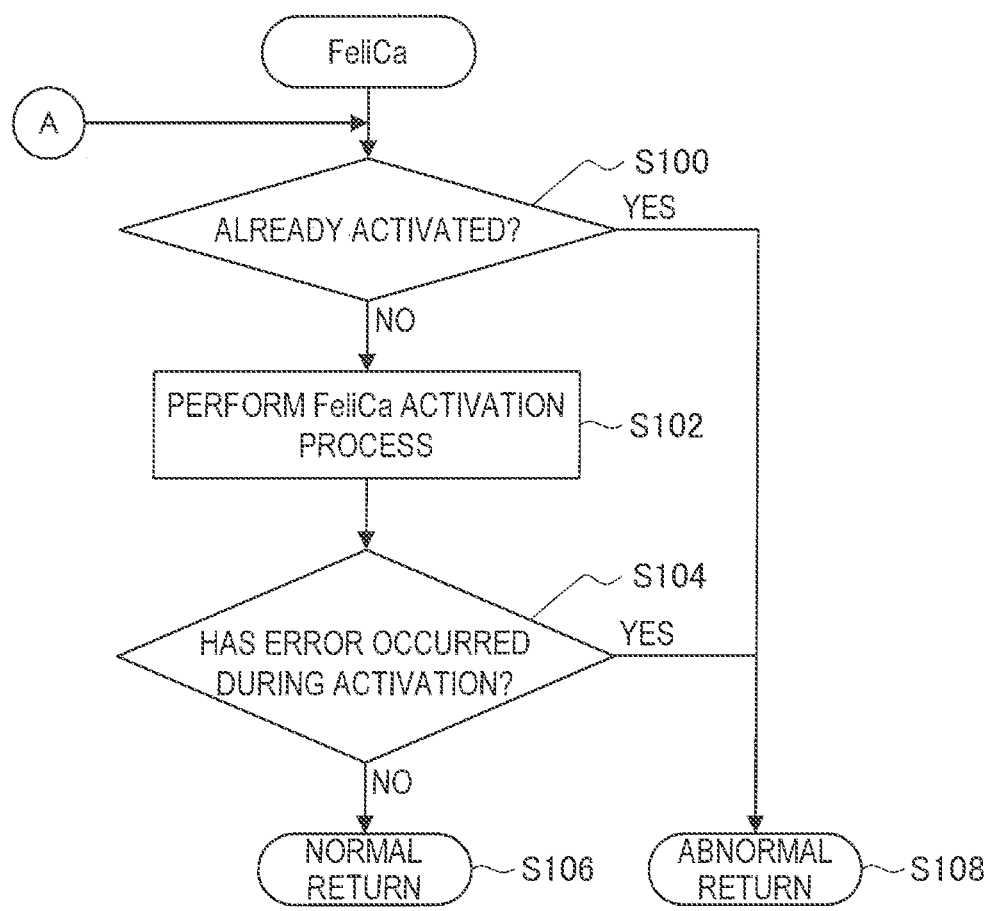
FIG. 13B is a flow chart which shows in detail the process which activates the FeliCa OS.

FIGS. 13A and 13B are flow charts which show in detail the process which activates the FeliCa OS 120, where FIG. 13A shows the process of the multi-platform 130, and FIG. 13B shows the process of the FeliCa OS 120. First, as shown in step S80 of FIG. 13A, it is judged whether or not the AID of an Executable Load Module included in the Install command matches the AID of the FeliCa OS 120, and in the case where they match, it proceeds to the following step S82. On the other hand, in the case where the AID of the Executable Load Module does not match the AID of the FeliCa OS 120, it proceeds to step S94, and an abnormal return is sent.

In step S82, it is judged whether or not it is possible for the memory regions, in which the size information included in the Install command is shown, to be secured in the EEPROM 170 of the information processing apparatus 100, and in the case where they can be secured, it proceeds to the following step S84. On the other hand, in the case where the size is not able to be secured, it proceeds to step S94, and an abnormal return is sent.

In step S84, Application AID information included in the Install command is registered in a table managed by the multi-platform 130. This table is similar to the table shown in FIG. 2, and AIDs, types (FeliCa) and system numbers are registered.

A prescribed memory region of the EEPROM 170 of the information processing apparatus 100 is occupied by the FeliCa OS 120 according to the size information, by having activated the FeliCa OS 120. Accordingly, in the following step S86, the size information of the EEPROM 170 managed by the multi-platform is updated.

In the following step S88, an activation process of the FeliCa OS 120 is called. When the multi-platform 130 calls the activation process of the FeliCa OS 120 in step S88, the processes from step S100 onwards shown in FIG. 13B are performed in the FeliCa OS 120.

First, in step S100, it is judged whether or not the FeliCa OS 120 has already been activated. In the case where the FeliCa OS 120 has not been activated, it proceeds to step S102, and an activation process of the FeliCa OS 120 is performed. On the other hand, in the case where the FeliCa OS 120 has been activated, it proceeds to step S108, and an abnormal return is sent to the multi-platform 130.

After step S102, it proceeds to step S104. In step S104, it is judged whether or not an error has occurred during the activation of the FeliCa OS 120, and in the case where an error has not occurred, it proceeds to step S106. In step S106, a normal return is sent to the multi-platform 130. Further, in step S104, in the case where an error has occurred during the activation of the FeliCa OS 120, it proceeds to step S108, and an abnormal return is sent to the multi-platform 130.

In step S90, after the FeliCa activation process has been called in step S88 of FIG. 13A in the multiplatform 130, it is judged whether or not an abnormal return has been returned. In the case where an abnormal return has been returned, it proceeds to step S92, and the AID information registered in step S84 is deleted from the table managed by the multi-platform 130.

After step S92, it proceeds to step S93. In step S93, the size information of the EEPROM managed by the multi-platform 130 is returned to the original size information. After step S93, it proceeds to step S94, and an abnormal return is sent.

On the other hand, in the case where an abnormal return is not returned in step S90, it proceeds to step S96, and a normal return is sent.

Note that in the case where the processes of step S84 and step S86 are performed after the FeliCa OS 120 has been activated, it is assumed that the processes of step S84 and step S86 may be unable to be performed due to factors such as power stoppages. In this case, it will become a condition in which the registration to the table and updating of the EEPROM size information are not performed, regardless of the FeliCa OS 120 being activated. Accordingly, in the processes of FIG. 13A and FIG. 13B, the activation process is performed after the registration to the table and updating of the EEPROM size information, and in the case where an error occurs in the activation, the registration is deleted and the size information returns to the original size information. In this way, only in the case where the FeliCa OS 120 is activated can the registration to the table and updating of size information be performed.

FIG. 14 is a schematic diagram for describing a command (Install for install and make selectable) defined by the global platform, and shows specifications provided by ISO7816 of an APDU (Application Protocol Data Unit). As shown in FIG. 14, the APDU is composed from each of the codes of CLA, INS, P1, P2, LC, DATA, and Le. Among these, it shows that in the case where a value of the INS code is "E6", it is an Install command.

Further, install and make selectable are defined by P1 (Reference Control Parameter). FIG. 14 is a schematic diagram which also shows the Reference Control Parameter P1. The Reference Control Parameter P1 includes the 8 bits of b8, b7, b6, b5, b4, b3, b2, and b1. In the case where b8, b7, b6, b5, b4, b3, b2, and b1 are 0, 0, 0, 0, 1, 1, 0, 0, respectively, such as shown enclosed by the dashed lines in FIG. 14, that is, in the case where P1 is "0C", an Install command (Install for install and make selectable) is defined.

FIG. 15 is a schematic diagram which shows a data field (DATA) of FIG. 14. As shown in FIG. 15, the AID of the FeliCa OS 120 is inserted into the "Executable Module AID". Further, an "Application AID" can be freely set by the user.

Further, the size information of the FeliCa OS 120 is included in the "Install Parameter field". Based on this size information, the multi-platform 130 secures the size of an NVM (Non-volatile memory) handled by the FeliCa OS 120.

Figure 16:
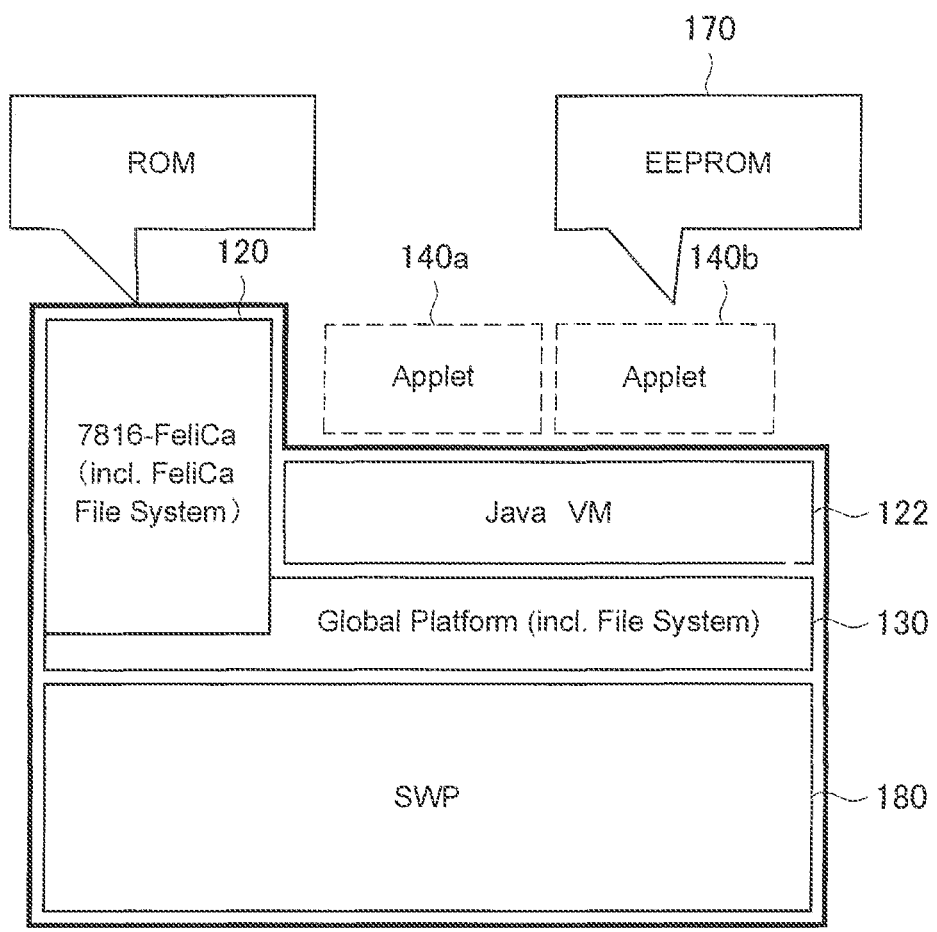
FIG. 16 is a schematic diagram which shows an IC chip according to the present embodiments.

FIG. 16 is a schematic diagram which shows an IC chip 200 according to the present embodiments. The IC chip 200, as an example, is a SIM card (Subscriber Identity Module Card) used for a mobile phone device or the like. As shown in FIG. 16, the basic configuration of the IC chip 200 is similar to that of the information processing apparatus 100 of FIG. 1. However, the IC chip 200 includes an SWP (Single Wire Protocol) as an interface, and is connected to a device, such as a mobile phone, through the SWP.

As described above, since the FeliCa OS 120 can be activated by an Install command of the multi-platform 130, a situation in which the method of activation is different for each card can be suppressed. Therefore, it becomes possible to activate the FeliCa OS 120 by a unified command.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus, including:
a multi-platform capable of managing a plurality of applications; and
an operating system which operates on the multi-platform, and is capable of being activated by a command of the multi-platform.

(2) The information processing apparatus according to (1), wherein the command includes a size of a memory region which the operating system is capable of using.

(3) The information processing apparatus according to (1),
wherein the multi-platform manages the plurality of applications with authentication codes, and
wherein the multi-platform manages the operating system with the authentication codes.

(3) The information processing apparatus according to (3),
wherein the operating system is capable of performing region separation.

(5) The information processing apparatus according to (3),
wherein the multi-platform has a table which includes the authentication codes corresponding to each region on which region separation is performed, and the authentication codes corresponding to the plurality of applications.

(6) The information processing apparatus according to (3),
wherein the multi-platform sends a separate command for performing region separation on the operating system to the operating system, and
wherein the separate command includes authentication codes corresponding to new regions obtained by the region separation and a number of separate blocks according to the region separation.

(7) The information processing apparatus according to (6),
wherein when the separate command is received from the multi-platform, the operating system performs region separation on a number of blocks specified by the separate command, and returns authentication codes of regions newly generated by the region separation and system numbers in the operating system, to the multi-platform.

(8) An IC chip, including:
a multi-platform capable of managing a plurality of applications; and
an operating system which operates on the multi-platform, and is capable of being activated by a command of the multi-platform.

(9) An information processing method, including:
receiving, at a multi-platform capable of managing a plurality of applications, a command for activating an operating system which operates on the multi-platform; and
executing, at the multi-platform which has received the command, a process which activates the operating system.

(10) The information processing method according to (9), further including:
sending, as a separate command for performing region separation on the operating system, authentication codes corresponding to new regions obtained by the region separation and a number of separate blocks according to the region separation, from the multi-platform to the operating system;
separating regions according to the separate command by the operating system which has received the separate command;
returning system numbers corresponding to regions obtained by the region separation of the operating system to the multi-platform; and
registering the system numbers in a table in association with authentication codes corresponding to regions obtained by the region separation of the multi-platform.

(11) A program for causing a computer to execute the functions of
receiving, at a multi-platform capable of managing a plurality of applications, a command for activating an operating system which operates on the multi-platform, and
executing, at the multi-platform which has received the command, a process which activates the operating system.

(12) The program according to (11), further causing a computer to execute the functions of
sending, as a separate command for performing region separation on the operating system, authentication codes corresponding to new regions obtained by the region separation and a number of separate blocks according to the region separation, from the multi-platform to the operating system,
separating regions according to the separate command by the operating system which has received the separate command,
returning system numbers corresponding to regions obtained by the region separation of the operating system to the multi-platform, and
registering the system numbers in a table in association with authentication codes corresponding to regions obtained by the region separation of the multi-platform.

(13) An information processing system, including:
a first apparatus which sends, in order to perform region separation on an operating system which operates on a multi-platform capable of managing a plurality of applications and use the operating system, authentication codes corresponding to new regions obtained by the region separation and a number of separate blocks according to the region separation;
a second apparatus which generates a separate command including the authentication codes and the number of blocks; and
a third apparatus which includes the multi-platform and the operating system, and which receives the separate command and performs region separation on the operating system, and registers in a table authentication codes corresponding to the new regions obtained by the region separation and a system number.

The present disclosure contains subject matters related to those disclosed in Japanese Priority Patent Application JP 2012-007322 filed in the Japan Patent Office on Jan. 17, 2012, and Japanese Priority Patent Application JP 2012-112349 filed in the Japan Patent Office on May 16, 2012, the entire contents of which are hereby incorporated by reference.

The invention claimed is:
1. An information processing apparatus, comprising:
a communication interface configured to communicate with an external device via near field communication;
an operating system configured to manage a plurality of applications, wherein
at least one application from the plurality of applications is selected by a user, and
the selected at least one application is operated on the operating system;
a communication unit configured to communicate with a service provider via Internet; and a central processing unit (CPU) configured to:
    execute a set of instructions stored in a specific memory; and
    control each of the communication interface, the operating system, and the communication unit based on the execution of the set of instructions, wherein
        the operating system is further configured to manage each application of the plurality of applications based on a corresponding Application identifier (ID) received via the communication unit, and
        the Application ID is generated by the service provider and sent from the service provider via the communication unit.

2. The information processing apparatus according to claim 1, wherein the CPU is further configured to activate the operating system based on a first command.

3. The information processing apparatus according to claim 2, wherein
    the information processing apparatus is configured to communicably couple to an external memory, and
    the first command includes size information of a size of a memory region of at least one of an internal memory of the information processing apparatus or the external memory.

4. The information processing apparatus according to claim 2, wherein
    the communication unit is further configured to receive the first command, and
    the first command is sent from the service provider via the Internet.

5. The information processing apparatus according to claim 1, wherein
    each application of the plurality of applications is associated with an authentication code of a plurality of authentication codes, and
    the plurality of authentication codes is allocated to a plurality of regions of one of an internal memory of the information processing apparatus or an external memory communicably coupled to the information processing apparatus.

6. The information processing apparatus according to claim 1, wherein
    the operating system is further configured to separate a memory region into a plurality of memory regions, and
    the memory region belongs to one of an internal memory of the information processing apparatus or an external memory communicably coupled to the information processing apparatus.

7. The information processing apparatus according to claim 6, wherein
    a size of each memory region of the plurality of memory regions is registered in a first table, and
    the first table is stored in the internal memory.

8. The information processing apparatus according to claim 1, wherein the operating system is registered as one of a first application type or a second application type.

9. An information processing method, comprising:
    in an information processing apparatus:
        communicating, via a communication interface, with an external device via near field communication;
        managing, via an operating system, a plurality of applications, wherein
            at least one application from the plurality of applications is selected by a user, and
            the selected at least one application is operated on the operating system;
        communicating, via a communication unit, with a service provider via Internet;
        executing, via a central processing unit (CPU), a set of instructions stored in a specific memory;
        controlling, via the CPU, each of the communication interface, the operating system, and the communication unit based on the execution of the set of instructions; and
        managing, via the operating system, each application of the plurality of applications based on a corresponding Application identifier (ID) received via the communication unit,
            wherein the Application ID is generated by the service provider and sent from the service provider via the communication unit.

10. The information processing method according to claim 9, further comprising
    activating, via the CPU, the operating system based on a first command.

11. The information processing method according to claim 10, further comprising
    communicably coupling the information processing apparatus to an external memory, wherein
    the first command includes size information of a size of a memory region of at least one of an internal memory of the information processing apparatus or the external memory.

12. The information processing method according to claim 10, further comprising
    receiving, via the communication unit, the first command,
        wherein the first command is sent from the service provider via the Internet.

13. The information processing method according to claim 9, wherein
    each application of the plurality of applications is associated with an authentication code of a plurality of authentication codes, and
    the plurality of authentication codes is allocated to a plurality of regions of one of an internal memory of the information processing apparatus or an external memory communicably coupled to the information processing apparatus.

14. The information processing method according to claim 9, further comprising
    separating, via the operating system, a memory region into a plurality of memory regions,
        wherein the memory region belongs to one of an internal memory of the information processing apparatus or an external memory communicably coupled to the information processing apparatus.

15. The information processing method according to claim 14, wherein
    a size of each memory region of the plurality of memory regions is registered in a first table, and
    the first table is stored in the internal memory.

16. The information processing method according to claim 9, wherein the operating system is registered as one of a first application type or a second application type.

17. A non-transitory computer-readable medium having stored thereon computer-executable instructions that, when executed by an information processing apparatus, cause the information processing apparatus to execute operations, the operations comprising:
    communicating, via a communication interface, with an external device via near field communication;
    managing, via an operating system, a plurality of applications, wherein at least one application from the plurality of applications is selected by a user, and the selected at least one application is operated on the operating system;

communicating, via a communication unit, with a service provider via Internet;

executing, via a central processing unit (CPU), a set of instructions stored in a specific memory;

controlling, via the CPU, each of the communication interface, the operating system, and the communication unit based on the execution of the set of instructions; and managing, via the operating system, each application of the plurality of applications based on a corresponding Application identifier (ID) received via the communication unit, wherein the Application ID is generated by the service provider and sent from the service provider via the communication unit.

18. The non-transitory computer-readable medium according to claim 17, wherein the operations further comprise activating, via the CPU, the operating system based on a first command.

19. The non-transitory computer-readable medium according to claim 17, wherein each application of the plurality of applications is associated with an authentication code of a plurality of authentication codes, and the plurality of authentication codes is allocated to a plurality of regions of one of an internal memory of the information processing apparatus or an external memory communicably coupled to the information processing apparatus.

20. The non-transitory computer-readable medium according to claim 18, wherein the operations further comprise receiving, via the communication unit, the first command, wherein the first command is sent from the service provider via the Internet.

* * * * *